United States Patent
Batley et al.

(10) Patent No.: US 10,521,368 B2
(45) Date of Patent: Dec. 31, 2019

(54) ARBITRATION OF REQUESTS REQUIRING A VARIABLE NUMBER OF RESOURCES

(71) Applicant: ARM LIMITED, Cambridge (GB)

(72) Inventors: Max John Batley, Cottenham (GB); Ian Michael Caulfield, Cambridge (GB); Chris Abernathy, Austin, TX (US)

(73) Assignee: ARM Limited, Cambridge (GB)

( * ) Notice: Subject to any disclaimer, the term of this patent is extended or adjusted under 35 U.S.C. 154(b) by 203 days.

(21) Appl. No.: 14/757,577

(22) Filed: Dec. 24, 2015

(65) Prior Publication Data

US 2017/0185542 A1    Jun. 29, 2017

(51) Int. Cl.
*G06F 13/16* (2006.01)
*G06F 12/128* (2016.01)
*G06F 12/12* (2016.01)

(52) U.S. Cl.
CPC ........ *G06F 13/1642* (2013.01); *G06F 12/128* (2013.01); *G06F 13/1673* (2013.01); *G06F 12/12* (2013.01)

(58) Field of Classification Search
None
See application file for complete search history.

(56) References Cited

U.S. PATENT DOCUMENTS

| | | | | |
|---|---|---|---|---|
| 5,630,067 A * | 5/1997 | Kindell | | G06F 9/5011 709/231 |
| 5,826,082 A * | 10/1998 | Bishop | | G06F 9/5011 718/100 |
| 5,850,395 A * | 12/1998 | Hauser | | G06F 15/17375 370/398 |
| 6,009,275 A * | 12/1999 | DeKoning | | G06F 9/5011 710/113 |
| 2003/0120822 A1* | 6/2003 | Langrind | | H04L 29/1232 709/251 |
| 2006/0070072 A1* | 3/2006 | Togawa | | G06F 9/52 718/100 |
| 2008/0225872 A1* | 9/2008 | Collins | | H04M 3/5232 370/412 |
| 2009/0164727 A1* | 6/2009 | Penton | | G06F 11/1064 711/118 |
| 2009/0248994 A1* | 10/2009 | Zheng | | G06F 9/5016 711/151 |
| 2010/0064108 A1* | 3/2010 | Harris | | G06F 12/0831 711/146 |
| 2010/0228898 A1* | 9/2010 | Aranguren | | G06F 3/061 710/56 |
| 2010/0312883 A1* | 12/2010 | Winn | | G06F 9/4881 709/224 |

(Continued)

*Primary Examiner* — Henry Tsai
*Assistant Examiner* — Aurangzeb Hassan
(74) *Attorney, Agent, or Firm* — Nixon & Vanderhye P.C.

(57) ABSTRACT

Arbitration circuitry is provided for arbitrating between requests awaiting servicing. The requests require variable numbers of resources and the arbitration circuitry permits the request to be serviced in a different order to the order in which they were received. Checking circuitry prevents a given request other than a oldest request from being serviced when a number of available resources is less than a threshold number of resources. The threshold number is varied based on the number of resources required for at least one other request awaiting servicing.

16 Claims, 5 Drawing Sheets

(56) References Cited

U.S. PATENT DOCUMENTS

| | | | |
|---|---|---|---|
| 2012/0096455 A1* | 4/2012 | Katsumata | G06F 8/61 717/177 |
| 2015/0378620 A1* | 12/2015 | Brown | G06F 3/0619 711/162 |
| 2016/0099062 A1* | 4/2016 | Ko | G11C 16/10 365/185.29 |
| 2016/0191420 A1* | 6/2016 | Nagarajan | H04L 45/7453 370/389 |
| 2017/0034845 A1* | 2/2017 | Liu | H04L 1/0003 |

* cited by examiner

ARBITRATION OF REQUESTS REQUIRING A VARIABLE NUMBER OF RESOURCES

BACKGROUND

Technical Field

The present technique relates to the field of data processing.

Technical Background

Within a data processing system, there may be a point at which a number of requests are received which compete for a limited number of resources (e.g. instructions to be handled using a limited number of processing slots, requests for storage capacity in a buffer, etc.). Therefore, arbitration circuitry may be provided to arbitrate between the received requests awaiting servicing, to manage the order in which the requests are handled.

SUMMARY

At least some examples provide an apparatus comprising:
arbitration circuitry to arbitrate between a plurality of requests awaiting servicing, each request requiring a variable number of resources in order to be serviced, wherein the arbitration circuitry is configured to permit servicing of the requests in a different order to an order in which the requests were received;
wherein the arbitration circuitry comprises checking circuitry to prevent a given request other than an oldest request from being serviced when a number of available resources is less than a threshold number of resources; and
the checking circuitry is configured to vary said threshold number of resources in dependence on the number of resources required for at least one other request awaiting servicing.

At least some examples provide a data processing method comprising:
arbitrating between a plurality of requests awaiting servicing, each request requiring a variable number of resources in order to be serviced, wherein the requests are permitted to be serviced in a different order to an order in which the requests were received; and
preventing a given request other than an oldest request from being serviced when a number of available resources is less than a threshold number of resources, wherein the threshold number of resources is varied in dependence on the number of resources required for at least one other request awaiting servicing.

At least some examples provide an apparatus comprising:
means for arbitrating between a plurality of requests awaiting servicing, each request requiring a variable number of resources in order to be serviced, wherein the arbitration circuitry is configured to permit servicing of the requests in a different order to an order in which the requests were received;
wherein the means for arbitrating comprises means for preventing a given request other than an oldest request from being serviced when a number of available resources is less than a threshold number of resources; and
the means for preventing is configured to vary said threshold number of resources in dependence on the number of resources required for at least one other request awaiting servicing.

Further aspects, features and advantages of the present technique will be apparent from the following description of examples, which is to be read in conjunction with the accompanying drawings.

DESCRIPTION OF EXAMPLES

Arbitration circuitry may be provided in a processing system to arbitrate between a number of requests awaiting servicing. The requests could be of a wide variety of types, but could for example include data access instructions awaiting processing or cache linefill requests. When each request requires a certain fixed number of resources in order to be serviced, then the arbitration may be relatively straight forward as when the fixed number of resources become available then another request can be selected for servicing.

However, in some cases requests may require a variable number of resources. For example, data access instructions could trigger a variable number of data access transactions to memory. For performance reasons, it can be useful to permit the arbitration circuitry to select the request for servicing in a different order to the order in which the requests were received, so that if, for example, there are not enough resources to service an older request, a younger request that requires fewer resources can be selected first.

However, this causes an added complication in that there may be dependencies between different requests, so a younger request may depend on the outcome of an earlier request. If a younger request requiring relatively few resources is selected for servicing the first, and blocks use of some of the resources, this may prevent an older request which requires a greater number of resources from being serviced. However, if the younger request is itself dependent on the older request then the younger request can never complete and so a deadlock situation could arise where forward progress cannot be made. One approach for preventing this may be to track the dependencies between the requests, but this would require more complex arbitration logic.

To avoid considering the actual dependencies, one approach would be for the arbitration circuitry to reserve the maximum possible number of resources (the highest number of requests that could possibly be required for any single request) for the oldest request remaining, so that the oldest request can always be serviced regardless of whether other younger requests have been selected for servicing already. However, this approach may be too conservative as if the oldest request does not actually require the maximum possible number of resources, some resources are effectively wasted, and this may prevent a younger request being serviced unnecessarily. Typically, in order to make such a system work efficiently, there needs to be a sufficient number of resources that even with the maximum possible number of resources being reserved for the oldest request, there are a reasonable number of other resources available for servicing younger requests.

However, increasingly there is a desire to reduce the circuit area and power consumption of processing systems, and so some systems are being provided with fewer resources so that there may not be significantly more resources than the maximum possible number that could be requested by a given request. In this case, the approach of reserving the maximum possible number of resources for the oldest request can significantly reduce performance, since effectively it may constrain the requests to be handled in the order in which they were received, eliminating performance benefits which could be achieved by selecting the requests out of order.

Instead, the arbitration circuitry may be provided with checking circuitry to prevent a given request other than the oldest request from being serviced when a number of available resources is less than a threshold number of resources, where that threshold number of resources is varied in dependence on the number of resources required for at least one other request awaiting servicing. Hence, rather than using a fixed threshold number of resources corresponding to the maximum possible number of resources that could be required for any request, a variable threshold is used which depends on the actual number of resources required by at least one other request. With this approach, the resources provided can be used more efficiently because if the at least one other request requires relatively few resources, there is no need to reserve as many resources and so the given request can be permitted to be serviced when fewer resources are available. On the other hand, if a given set of pending requests require a large number of resources then the given request being arbitrated could be held back until more resources are available.

This approach may be considered counter-intuitive since one would expect that the area and power cost of providing circuitry for monitoring the actual numbers of resources required by the at least one other request and adjusting a threshold accordingly would not be justified. However, as the total number of resources is reduced to save area and power consumption, the performance cost of reserving the maximum possible number of resources for the oldest request increases, so that a little additional overhead in providing arbitration circuitry with checking circuitry for varying the threshold based on the numbers of resources actually required by at least one other request may provide a significant performance improvement. By varying the threshold number of resources in dependence on the number of resources required by at least one other request, the resources can be managed more efficiently and so either fewer total resources are required for providing a given level of performance, or a higher performance can be provided with a given number of resources.

The checking circuitry may vary the threshold number of resources for the given request in dependence on both the number of resources required for that given request and the number of resources required for at least one other request.

In some examples, the checking circuitry may vary the threshold number of resources in dependence on a maximum number of resources corresponding to a maximum of one or more respective numbers of resources required for each of the at least one other request. Note that this refers to the maximum of the numbers of resources which are actually required for the at least one other request, rather than the maximum possible number of requests which could theoretically be requested by a single request. For example, if there are a number of requests pending which could each request up to four resources, but the currently pending requests actually require one, two and one resources respectively, then the maximum number of resources considered for varying the threshold number of resources would be two. By considering the maximum number of resources required by any of the pending at least one other request, rather than the theoretical maximum, this may allow fewer resources to be reserved for the oldest request, so that the resources can be used more efficiently.

More particularly, the threshold number of resources for the given request may correspond to a sum of the number of resources required for the given request and the maximum number of resources. This means that the threshold number of resources are available, and hence the given request can be selected for servicing, the remaining resources would be enough to handle any single other request of the at least one other request considered for determining the threshold. Hence, even if the given request is dependent on one of the at least one other request, the other request can still be serviced so that the given request may proceed. One may expect that the threshold number of resources should correspond to the sum of the number of resources required for the given request and the total number of resources required by each of the at least one other request (not the maximum), so that even if the given request is dependent on a sequence of two or more other requests then each of those requests can still be serviced using the remaining resources after the given request is selected. However, the inventors recognised that considering the maximum among the numbers of resources required by each request, rather than the total, is enough because even if the given request is dependent on a sequence of two or more other requests, each of that sequence can still be handled sequentially one after the other and so eventually the selected request can still be handled once each of the sequence on which it depends has completed.

Hence, by providing a threshold corresponding to the sum of the number of resources required for the given request and the maximum among the numbers of resources required by each of the at least one other request, this reserves enough resources to ensure that if the given request is selected it cannot block any earlier request on which it might depend (without needing to actually consider the dependencies between requests), but is not too conservative.

There may be a number of ways of determining whether the number of available resources is less than the threshold number of resources. In some cases, the threshold number could actually be determined, and compared against the number of available resources.

However, it is also possible to perform other operations which give the same result as comparing the number of available resources against the threshold number. For example, the threshold number of resources may not actually be determined explicitly, but may be implicit in another value used in the comparison operation.

For example, in some cases the checking circuitry could determine a number of remaining resources which would still be available after the given request is selected for servicing. For example, the number of remaining resources may correspond to a difference between the number of available resources and the number of resources required for the given request. The given request could then be prevented from being serviced when the number of remaining resources is smaller than the maximum number of resources among the number of resources required by each of the at least one other request. This may give the same result as comparing the number of available resources and a threshold corresponding to the sum of the maximum number of resources and the number of resources required by the given request.

In some examples, an arithmetic comparison can be used to determine whether the number of available resources exceeds the threshold number of resources. For example, the threshold number can be subtracted from the number of available resources, or the maximum number of resources required by any of the at least one other request can be subtracted from the number of remaining resources, and the given request can be prevented from being serviced when the result is negative.

However, another approach is for the checking circuitry to generate a first value in which a position of a most significant non-zero bit is dependent on said maximum number of resources, and a second value including a least significant portion of bits equal to 0 and any remaining bits equal to 1, where the number of bits in the least significant portion of the second value is dependent on the number of available resources, and either the position of the most significant non-zero bit in said first value or the number of bits in the least significant portion of said second value is dependent on the number of resources required for the given request. A bitwise AND operation can then be performed on the first value and the second value to generate a comparison value, and the given request can be prevented from being serviced when the comparison value includes at least one bit equal to 1. This approach can be faster than performing an arithmetic comparison and may require less circuit area.

In some cases, the at least one other request considered to determine the threshold number of resources required for servicing of the given request may comprise at least one older request still to be selected for servicing which was received before the given request. As it can generally be assumed that an older request will not be dependent on a younger request, when determining whether it is safe to issue a given request for servicing, there is no need to consider the numbers of resources required by requests which are younger than the given request. Therefore, by considering only older requests, there is less chance that a given request is held back unnecessarily due to a younger request requiring a large number of resources. Hence, this approach can help to improve performance.

Note that considering the numbers of resources required by older requests than the given request means that the threshold may vary for each pending request depending on its age relative to other requests. To support this approach, an age matrix may be provided to store an indication of whether each other request is older or younger than the given request. Also, the checking circuitry may comprise a number of request checking circuits each corresponding to a given request. Each request checking circuit may determine whether to prevent the corresponding request being serviced based on the number of available resources, the number of resources required by the corresponding request and the maximum of one or more respective numbers of resources corresponding to at least one older request than the corresponding request.

On the other hand, in other examples the at least one other request considered for determining whether a given request can be serviced may comprise all the other requests still to be selected for servicing. This approach can be more area efficient because the maximum number of resources used to vary the threshold can be determined once for all the pending requests rather than being different for each request depending on its age. While sometimes this could lead to a given request being prevented from being serviced when a younger request requires a relatively large number of resources, this slight reduction in performance may be justified in order to save circuit area and power.

Hence, the checking circuitry may comprise a shared maximum determining circuit for determining the maximum number of resources among all the pending requests, and a number of request checking circuits which each determine whether a corresponding request should be prevented from being serviced based on the number of available resources, the number of resources required by the corresponding request and the maximum number of resources determined by the maximum determining circuitry. By sharing the maximum determining circuitry among all the requests checking circuit rather than determining a separate maximum for each request checking circuit, the circuit overhead can be reduced.

Regardless of which approach is taken, the checking circuitry may determine whether the oldest remaining request can be serviced regardless of the number of resources required by other requests. For example, the oldest remaining request could be permitted to be serviced as long as there are sufficient resources available for servicing that request, regardless of how many resources are required by other requests. In the embodiment where only the numbers of resources required by older requests are considered for arbitrating a given request, this feature may be inherent since there would not be any older requests when considering the oldest remaining request. However, in an embodiment which considers all pending requests as the at least one other request, some circuitry can be provided for overriding the comparison based on the number of available resources and the threshold determined using other requests when the given request currently being arbitrated is the oldest remaining request.

The number of available resources can be determined in different ways. In some cases, the resources considered as "available" may be free resources which are currently free to allocated for servicing one of the requests. Hence, servicing of a given request may depend on there being at least the threshold number of free resources which are immediately available.

Alternatively, the number of available resources could include not only the free resources, but also freeable resources which are currently allocated for servicing a request, but for which freeing of the resources is independent on an outcome of any other outstanding request. For example, the arbitration circuitry may receive an indication of dependencies between requests, so that it can determine which resources will be drained irrespective of the outcome of other requests. Since it is known that the freeable resources will eventually become available regardless of which other requests are issued for servicing or held back, the freeable resources can be considered when comparing against the threshold number of resources to determine whether a given request can be safely issued, without risk of blocking other requests on which the given request depends. By considering both the free and freeable resources as available (for the purposes of the variable threshold comparison at least), performance can be improved since this may allow some requests to be selected for servicing earlier than would be possible if they had to wait for the threshold number to actually become free.

When the available resources include both free and freeable resources, the checking circuitry may also provide a further check to prevent the given request being serviced when the number of free resources is less than the number of resources required for the given request. Hence, there may be two constraints which govern whether a given request can be serviced—firstly the number of free resources should be greater than or equal to the number of resources required by the given request (which checks whether there is enough resource for handling the given request itself), and secondly the total number of free and freeable resources should be greater than or equal to the variable threshold number of resources determined for that given request (which checks whether there is a risk that selecting the given request for servicing could block servicing of an earlier request on which the given request could depend).

Note that the checking circuitry may not be the only stage of arbitration. Sometimes two or more requests may each pass the checks performed by the checking circuitry discussed above. Hence, the arbitration circuitry may then perform a further arbitration to select a request to be serviced from among any requests determined as allowed to be serviced by the checking circuitry. The arbitration circuitry could perform this further arbitration using any known arbitration technique such as random, round robin, weighted round robin, least recently used, pseudo least recently used, etc. For example, in some embodiments there may be a number of request slots which each include a checking circuit for determining whether a corresponding request is safe to issue for servicing in dependence on the number of available resources and the variable threshold number of resources discussed above, and each checking circuit may only request arbitration of the corresponding request by the arbitration circuitry when it determines that request as safe to issue. The arbitration circuitry may then receive signals from each checking circuit indicating whether the corresponding request is safe, and select the particular request to be serviced among those requests indicated as safe. By separating the checking of the checking circuitry (based on the numbers of requests required by the pending requests) from a subsequent arbitration stage, a relatively simple arbitration circuit using any known arbitration scheme can be used.

Note that with the present technique there is no need to consider the actual dependencies between requests when determining whether it is safe to allow a request to be serviced (although it is possible to do so in some embodiments). The comparison of the number of available resources and the variable threshold number of resources when determining whether each request is safe to issue can avoid livelock situations even when there are dependencies between requests, without actually needing to track the dependencies. This simplifies the arbitration circuitry, and allows the requests to be safely arbitrated even if there is no information available on the dependencies. Hence, in some embodiments the checking circuitry may determine whether to allow or prevent a given request being serviced independently of whether the given request is dependent on another request.

Note that the threshold number of resources for a given request may vary over time, as other requests are received or serviced. For example, as other requests are received or serviced, the maximum among the numbers of resources required by other requests will change, which will lead to different thresholds being used for determining whether the given request is safe to issue. For example, when an older request requiring a relatively large number of resources is selected for servicing, the thresholds for one or more younger requests may then decrease which can then allow those requests to be serviced.

Which requests are regarded as "older" or "younger" may vary from embodiment to embodiment. In some cases, an "older" request may be a request which was received by the arbitration circuitry earlier than a "younger" request. In another case, an "older" request may be a request which corresponds to an instruction which appears earlier in a program order than an instruction corresponding to a "younger" request (the program order may be an order in which the instructions are fetched from an instruction cache or memory). Also, the arbitration circuitry may receive age indications for respective pairs of requests, each age indication indicating which of the corresponding pair of requests is older, and in this case the "older" request may simply be a request indicated as older than another "younger" request by the corresponding age indication.

As discussed above, the requests may be any request requiring a variable number of resources to be serviced, and the resources may comprise anything required for servicing the requests, for which when a resource is being used for servicing one request, it cannot simultaneously be used for servicing another request. For example, each resource could be bandwidth on a bus, storage capacity in a buffer or other circuitry, a processing timeslot on a processing circuit or other circuit for handling the requests.

In one example, each request may comprise a data access instruction (e.g. a load/store instruction) for triggering a variable number of data access transactions for accessing data in the data store. In this case, the resources may comprise transaction slots for handling the data access transactions. For example, each transaction slot may control the exchange of data, address or control signals between the load/store queue and a memory system for handling a corresponding load/store instruction. A single instruction may require multiple transactions, in which case multiple transaction slots may be required. The arbitration circuitry discussed above may be provided for selecting which data access instructions should selected for servicing based on the number of available transaction slots and the number of transaction slots required by respective instructions.

In another example, a cache may have a buffer for storing data loaded from memory or a further cache. For example, the buffer may be a linefill buffer which can store data loaded from the next level of the memory system temporarily while waiting for space to be allocated in the cache, or a read buffer which permits the loaded data to be read by processing circuitry before it has actually been allocated into the cache (in some cases the same buffer may function both as a linefill buffer and a read buffer). Some linefill requests for data to be fetched into the buffer may require variable amounts of data and hence the amount of space required in the buffer may vary for different requests. Hence, the resource may be storage space in the buffer, and the arbitration circuitry discussed above may be provided for selecting which linefill requests should be issued to the next level of the memory system in dependence on the available space in the buffer and the amount of buffer space required by other requests.

Figure 1:
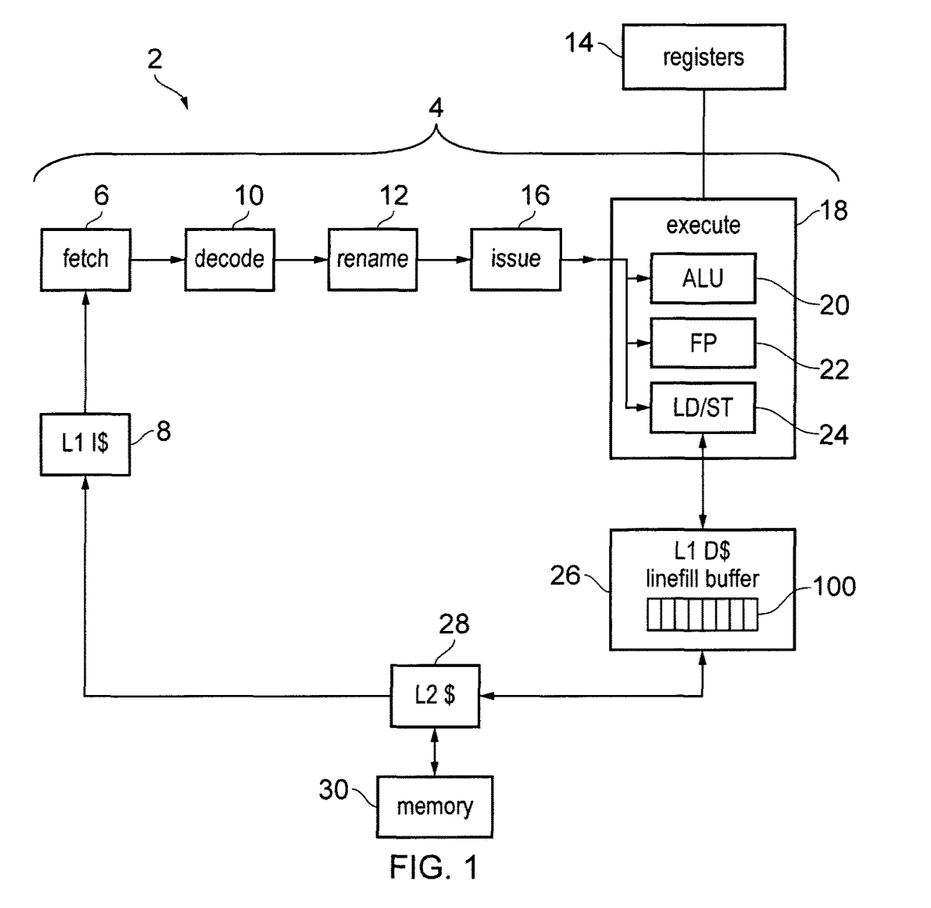
FIG. 1 schematically illustrates an example of a data processing apparatus.

FIG. 1 schematically illustrates an example of a data processing apparatus 2 comprising a processing pipeline 4 for performing data processing in response to instructions. The pipeline 4 includes a number of pipeline stages including a fetch stage 6 for fetching instructions to be processed from an instruction cache 8, a decode stage 10 for decoding the fetched instructions, a register rename stage 12 for performing register renaming to map architectural registers specifiers specified by the decoded instructions to physical register specifiers identifying physical registers 14 provided in hardware, an issue stage 16 for queuing instructions awaiting execution while their operands become available and issuing instructions for execution when the operands are available, and an execute stage 18 for executing the issued instructions. The issue stage 16 may permit out-of-order issue of instructions for execution in a different order to the program order in which the instructions were fetched from the instruction cache 8 by the fetch stage 6. The execute stage 18 includes a number of execute units for processing different kinds of instructions, such as an arithmetic/logic unit (ALU) 20 for executing arithmetic or logical instructions, a floating point (FP) unit 22 for executing floating point instructions and a load/store unit 24 for executing load instructions for loading data from a memory system or store instructions for storing data to the memory system. As shown in FIG. 1, the memory system may include the instruction cache 8, a level 1 (L1) data cache 26, a level 2 (L2) cache 28 and main memory 30. In this example the L2 cache 28 is used as a shared instruction/data cache, but separate L2 instruction and data caches could also be provided. Also, it will be appreciated that there could be more than two levels of cache. FIG. 1 is merely schematic and for conciseness it does not show all possible components of the processing apparatus 2, so the apparatus 2 could also include other elements. Also, the arrangement of particular pipeline stages in the pipeline 4 and particular types of execute unit 20, 22, 24 of the execute stage 18 shown in FIG. 1 are just one example, and other types of pipeline stage or execute units could be provided.

Figure 2:
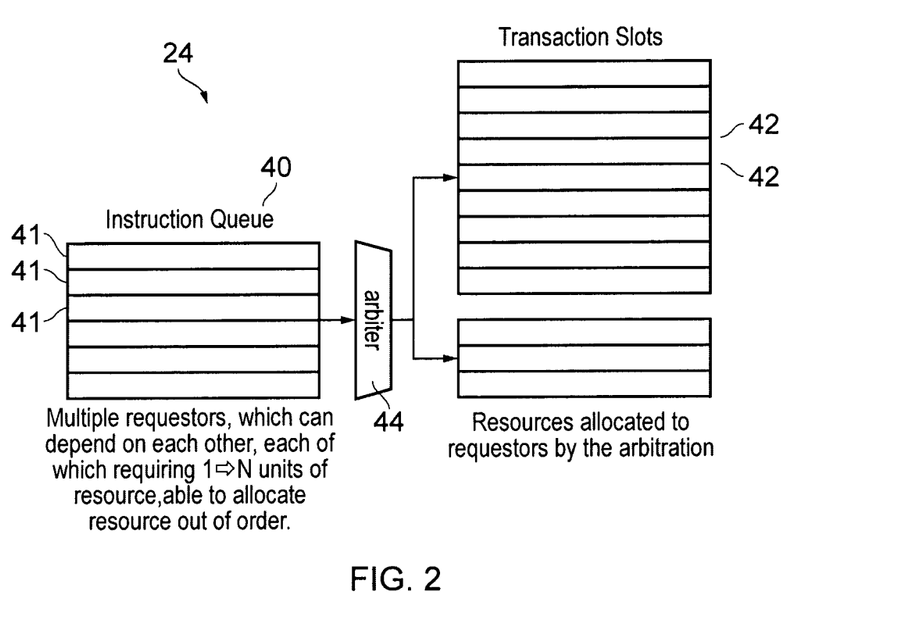
FIG. 2 shows an example of requests requiring a variable number of resources.

FIG. 2 shows an example of part of the load/store unit 24 for processing data access instructions such as loads and stores. The load store unit 24 may have an instruction queue 40 for queueing load or store instructions which are awaiting execution. The queue 40 includes a number of instruction slots 41 each for tracking a corresponding load/store instruction. Each instruction requires a variable number of data access transactions to be performed with respect to the memory system. Some instructions may only require one transaction, while other instructions may require multiple transactions. Each instruction may request up to N transactions. The load store unit 24 also includes a number of transaction slots 42 for handling memory access transactions for instructions selected for execution. For example, each transaction slot may include address generating circuitry for generating the target address of the transaction, and may control exchanging of data, address and control signals with the memory system to control data to be loaded from the memory system to the registers 14 or to be stored to the memory system from the registers 14. Each transaction slot 42 may also have hazard checking circuitry for comparing an address of the corresponding memory transaction against addresses of other transactions pending to avoid read-after-write or write-after-write hazards. Hence, if a given load/store instruction in one of the instruction slots 41 requires X transactions (where X is between 1 and N), it cannot execute unless there are X transaction slots 42 available.

As discussed above, the pipeline may be an out-of-order pipeline and so instructions may be issued for execution in a different order to the program order in which they were fetched from the instruction cache 8. For example, when an older instruction is stalled while waiting for a result of another instruction on which it depends, a younger instruction which is independent of that other instruction may be executed first. When there are dependencies between instructions which require use of a limited number of resources (such as the transaction slots 42), there can be a risk of deadlock where a younger instruction depends on a result of an older instruction but neither can proceed. For example, if a younger instruction is issued for execution ahead of an older instruction, and blocks use of some of the transaction slots 42, but the number of remaining transaction slots 42 is not enough to handle the older instruction, the older instruction cannot be issued. However, the younger instruction(s) cannot complete because it depends on the older instruction. In this case, no forward progress can be made. This problem could be addressed by tracking the dependencies between instructions, but this may require more complex arbitration. Instead, arbitration circuitry 44 is provided to control when a given instruction in an instruction slot 41 can be selected for servicing using transaction slots 42, using information on the number of transaction slots required by each instruction, regardless of whether respective instructions depend on each other. The arbitration scheme may ensure that younger instructions cannot use up all the transaction slots 42 and then stall waiting for an older instruction to compete which cannot issue any transactions because there are no transaction slots left.

Figure 3:
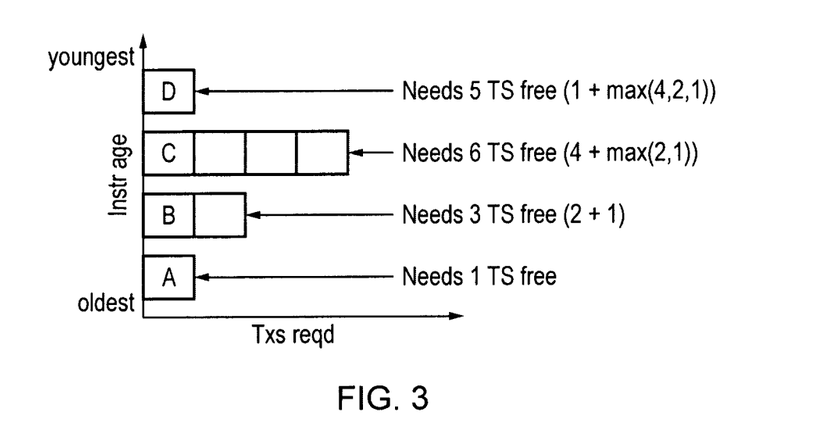
FIG. 3 shows an example of preventing requests from being serviced when a number of available resources is less than a threshold number of resources which varies in dependence on the number of resources required by other requests.

FIG. 3 schematically illustrates how the arbiter 44 controls servicing of each instruction in the instruction queue 40 based on the number of transaction slots 42 required by that particular instruction and the number of transaction slots required by other instructions. In particular, the arbiter 44 prevents a given instruction from being serviced when the number of available transaction slots is less than a variable threshold number of transaction slots, where that threshold is varied from instruction to instruction, and over time, based on the number of transaction slots required by other instructions.

In the example shown in FIG. 3, each instruction A, B, C, D has a corresponding threshold number of transaction slots which need to be available before that request can be serviced. The threshold corresponds to the number of transaction slots required by that instruction itself, plus the maximum of the respective numbers of transaction slots 42 required by any older instruction which has not yet been serviced (for the oldest instruction, the threshold is simply the number of transaction slots required by that instruction as there is no older instruction). If the number of available transaction slots is less than the threshold for a given instruction, that instruction is prevented from being serviced. For example, in FIG. 3 there are four pending instructions A, B, C, D which require 1, 2, 4 and 1 memory transactions respectively. Hence, the threshold number of resources required for each transaction is as follows:

instruction A requires 1 transaction, and there are no older instructions, and so the threshold=1.
  instruction B requires 2 transactions, and the maximum number of transactions required by any older transaction (A) is 1, so the threshold is 2+1=3.
  instruction C requires 4 transactions, and the maximum number of transactions required by any older transaction (B) is 2, so the threshold is 4+2=6.
  instruction D requires 1 transaction, and the maximum number of transactions required by any older transaction (C) is 4, so the threshold is 1+4=5.

Hence, the threshold varies for each instruction according to its relative age and the number transaction slots required for itself and other instructions.

An alternative approach would be to ignore the number of transaction slots actually required by other instructions, and simply prevent any instruction other than the oldest instruction issuing when the number of available transaction slots is less than the maximum possible number of transaction slots which could be required by any one instruction. For example, if the maximum possible number is 4, 4 transaction slots can be reserved for exclusive use by instruction A, and other instructions cannot issue unless it can be serviced while still leaving 4 or more transactions free for instruction A. For example, this would require instruction B to have 6 transaction slots free before it can issue (the 2 slots required for instruction B itself, plus the 4 transaction slots reserved in case instruction A needs the maximum possible number of transactions).

However, the approach shown in FIG. 3 is more efficient as it allows instruction B to be issued earlier, as it only requires 3 transaction slots free rather than 6. By varying the threshold for determining whether it is safe to issue a given instruction in dependence on the numbers of transactions actually required by other instructions (rather than a fixed theoretical maximum), the transaction slots can be used more efficiently and performance can be improved by allowing some instructions to issue sooner. This also means that a given level of performance can be achieved using fewer transaction slots 42, which helps to save circuit area as well as reducing power consumption (since each transaction slot 42 may have associated hazarding logic for detecting address hazards and other control logic).

The method shown in FIG. 3 works on the assumption that an older instruction will not be dependent on a younger instruction, and therefore transactions corresponding to an older instruction are guaranteed to drain from the transaction slots (making them free for use by other instructions) without depending on any transactions associated with younger instructions. For example, if there are six transaction slots free, instruction C can issue and take four of them. If instruction A is issued next, it can take one more, so that there are not enough transaction slots free for handling instruction B (which requires 2 transactions). However, since instruction A is older than B, A will drain without dependence on B, and eventually two transaction slots will become free even if C depends on B. Therefore, even if C depends on B and issuing C will temporarily block B from being processed, it does not block B indefinitely and so C is safe to issue. If C turns out to be independent of B, it can be processed sooner, to improve performance.

Figure 4:
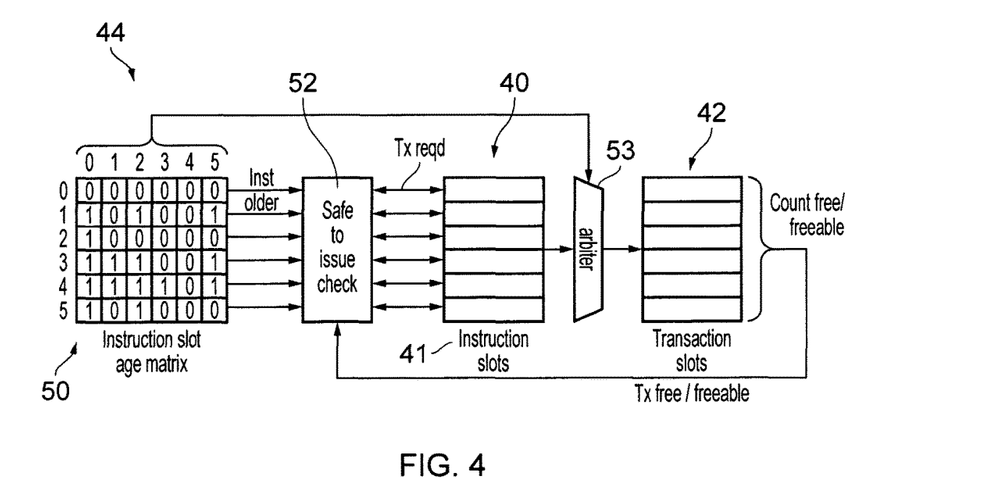
FIG. 4 shows an example of arbitration circuitry.

FIG. 4 shows an example of the arbitration circuitry 44 in more detail. The arbitration circuitry 44 includes an instruction age matrix 50 for tracking the relative age of each pair of pending instructions in the instruction queue 44. The age matrix 50 is effectively a table where each instruction corresponds to a given row and column of the matrix, and each element of the table stores a one-bit indicator 1/0 which indicates whether the instruction for the corresponding row is older or younger than the instruction for the corresponding column. That is, for the element in row X and column Y of the age matrix 50, one of 1 and 0 indicates that instruction $I_X$ is older than instruction $I_Y$ and the other of 1 and 0 indicates that instruction $I_X$ is younger than instruction $I_Y$. The diagonals of the age matrix 50 may all be set to 0 to indicate that a given instruction is not older than itself. For example, in an embodiment where a 0 in element (X, Y) indicates that instruction $I_X$ is older than $I_Y$, when a new instruction $I_Z$ is received in the instruction queue, all elements (0, Z), (1, Z), etc. of the corresponding column Z would be set to 0 and all elements (Z, 0), (Z, 1), etc. other than the diagonal element (Z, Z) would be set to 1. In this case, the matrix values shown in the example of FIG. 4 would signify that instruction $I_0$ is the oldest, instruction $I_4$ is the newest, and the 6 instructions were received in the order $I_0$, $I_2$, $I_5$, $I_1$, $I_3$, $I_4$. It will be appreciated that other techniques could also be used to indicate the relative age of each instruction (e.g. a numeric value representing the order in which the instructions were received). However, an age matrix of this form can be useful because the 0s and 1s of the respective elements may be used as inputs to logic gates (e.g. AND gates 64 as discussed below) to filter which requests are considered when checking whether a given request is safe to issue, based on which requests are older than the given request.

The arbitration circuitry 44 also includes issue checking circuitry 52 for checking whether it is safe to issue the instructions from each instruction slot 41. Each instruction slot 41 broadcasts to the issue checking circuitry 52 how many transaction slots that instruction requires, and the transaction slots 42 indicate how many transaction slots 42 are currently available (which can include separate indications of free transaction slots 42 which are already available and freeable transaction slots 42 which are not currently free but will drain without dependence on any other transaction). The issue checking circuitry 52 determines, for each instruction slot, whether there are enough transaction slots available for the corresponding instruction to be issued (based on the threshold discussed above for FIG. 3). When the checking circuitry 52 determines that an instruction in a given instruction slot is safe to issue, that instruction slot 41 makes a request for arbitration to an arbiter 53. The arbiter 53 selects an instruction to issue for servicing from among any instructions for which a request for arbitration has been made. As each instruction slot 41 only requests arbitration when the checking circuitry 52 has determined that the instruction is safe to issue, the actual arbiter 53 can be a simple arbiter which selects according to some known arbitration scheme, e.g. simple age-based selection, random selection, round robin selection, etc.

Figure 5:
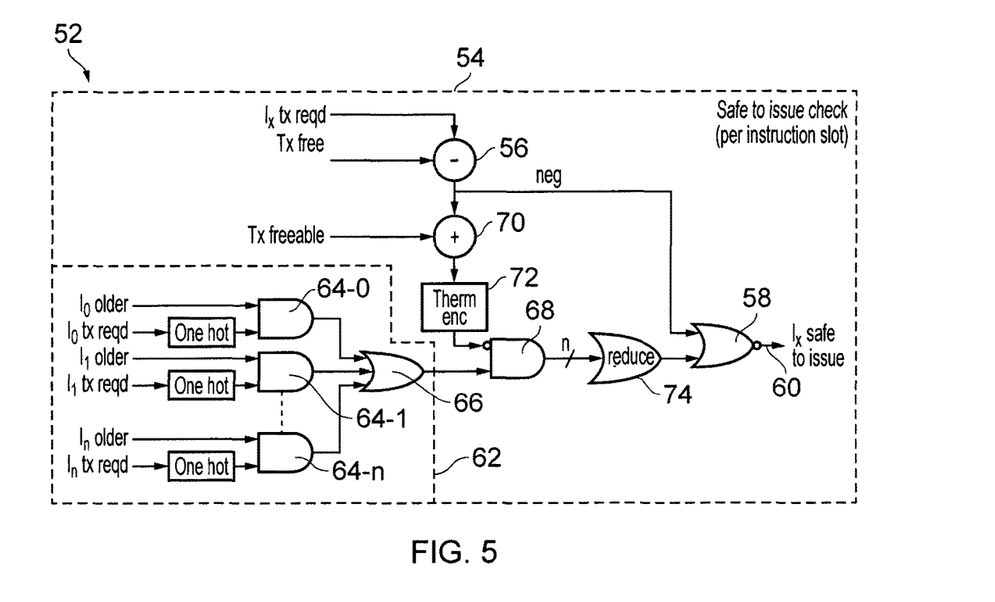
FIG. 5 shows an example of checking circuitry for determining whether a given request is safe to issue.

The checking circuitry 52 includes a number of request checking circuits 54, with each request checking circuit 54 checking whether a corresponding instruction is safe to issue. FIG. 5 shows one such request checking circuit 54. It will be appreciated that several such request checking circuits 54 are actually provided in the checking circuitry 52, one per instruction slot 41.

The request checking circuit 54 corresponding to a given instruction slot (corresponding to instruction $I_x$) receives the following indications:

$I_x$ tx reqd: the number of transaction slots required by instruction $I_x$;

Tx free: the number of free transaction slots 42 not currently allocated for servicing an instruction;

Tx freeable: the number of in-use transaction slots which will drain without dependence on any other transaction;

$I_0$ older, $I_1$ older, ..., $I_n$ older: age indications from the age matrix 50 indicating whether each pending instruction $I_0$ to $I_n$ in the instruction queue 40 is older than instruction $I_x$ (in this example, a $I_A$=1 indicates that instruction $I_A$ is older than instruction $I_X$, note that the age indication "$I_x$ older" for instruction $I_X$ itself will be 0);

$I_0$ tx reqd, $I_1$ tx reqd, ..., $I_n$ tx reqd: the number of transaction slots 42 required by each pending instruction $I_0$ to $I_n$ in the instruction queue 40.

The request checking circuit 54 includes a subtractor 56 to subtract the number of transactions required by instruction $I_x$ from the number of free transaction slots 42, i.e. the output of subtractor 56 represents how many transaction slots will still be free when instruction $I_x$ issues all its transactions. If the output of the subtractor 56 is negative (i.e. there are fewer slots free than this instruction requires), then this instruction cannot issue. The top bit of the output of the subtractor 56 (which indicates whether the output is negative) is provided as one of the inputs to a NOR gate 58. The output of NOR gate 58 is the signal 60 which indicates whether instruction $I_x$ is safe to issue. Hence, if the output of subtractor 56 is negative, one of the inputs of NOR gate is 1 and so the output is 0 indicating that the instruction cannot be issued. Therefore, instruction $I_x$ is prevented from being serviced until there are enough transaction slots free to service that instruction.

The request checking circuit 54 also includes maximum determining circuitry 62 for determining the maximum number of transaction slots required by any older instruction than instruction $I_x$. The maximum determining circuitry 62 includes a number of AND gates 64-0 to 64-$n$. A given AND gate 64-$y$ receives as its inputs the relative age indication ($I_y$ older) indicating whether instruction $I_y$ is older than instruction $I_x$ and a one-hot encoded value representing the number of transactions required for instruction $I_y$. A one-hot encoding is a value which has one bit set to '1' and all other bits set to '0', where the position of the '1' bit indicates the numeric value being encoded (e.g. 1, 2, 3, 4 may be represented by 4-bit encodings 0001, 0010, 0100, 1000 respectively). Hence, each AND gate 64-$y$ either outputs a value with all bits equal to 0 (if the corresponding instruction $I_y$ is not older than instruction or outputs a one-hot encoded value where the position of the most significant '1' bit represents the number of transactions required by instruction $I_y$. The outputs of each AND gate 64-0 to 64-$n$ are supplied as inputs to an OR gate 66 which combines the inputs according to a logical OR operation. Hence, the position of the most significant '1' bit in the output of OR gate 66 represents the maximum number of transaction slots 42 required by any of the instructions in queue 40 that are older than instruction $I_x$ (the number of transaction slots 42 required by younger instructions than $I_x$ are masked by the AND gates 64). The output of OR gate 66 is provided to another AND gate 68.

Also, the output of the subtractor 56 is added to the number of freeable transaction slots (Tx freeable) by adder 70. The output of adder 70 represents the number of remaining transaction slots which will still be free or freeable once all the transactions of instruction $I_x$ have been issued. The output of the adder 70 is thermometer-encoded by an encoder 72. A thermometer encoding is an encoding in which a certain number of bits include a lower portion and an upper portion, where all the bits in the lower portion are equal to one of 0 or 1, all the bits in the upper portion are equal to the other of 0 and 1, and the numeric value being encoded is represented by how many bits are included in the lower portion. For example, numeric values of 1, 2, 3, etc. could be represents as 0001, 0011, 0111 (or alternatively as 1110, 1100, 1000—clearly inverting the bits does not affect the number of bits in the lower portion).

In this example, the output of thermometer encoder 72 is such that the lower portion has '1' bits and the upper portion has '0' bits, and the output of thermometer encoder 72 is then inverted and supplied to AND gate 68. Alternative thermometer encoding schemes can generate the thermometer-encoded value with the lower portion having '0' bits and the upper portion having '1' bits, in which case no inversion of the AND input would be required.

The AND gate 68 combines the output of OR gate 66 and the inverted output of the thermometer encoder 72 according to a bitwise AND operation, and the result of the AND is supplied to an OR reduction gate 74 which combines all the bits of the AND output according to a logical OR operation to produce a single-bit output. The output of the OR reduction gate 74 is supplied as the second input of NOR gate 60.

Hence, the two inputs to AND gate 68 effectively represent:
 a maximum indicating value (output of OR gate 66) representing the maximum number of transaction slots required by any older instruction than instruction $I_x$, in a representation where the maximum number is identified by the position of the most significant '1' bit.
 a mask (derived from the thermometer encoding) which masks out a certain number of least significant bits of the maximum indicating value, where that number of bits corresponds to the number of transaction slots which would remain free or freeable when the current instruction $I_x$ issues all its transactions).

Hence, if there is an older instruction than instruction $I_x$ which requires more than the number of transaction slots which would remain when the current instruction $I_x$ is issued, the output of AND gate 68 includes at least one '1' bit, and so the output of OR reduction gate 74 is 1, and so the output of NOR gate 58 is 0, indicating that it is not safe to issue instruction $I_x$ because it could lead to an older instruction being blocked on which instruction $I_x$ could depend.

On the other hand, if there is no older instruction requiring more than the number of transaction slots which would remain when the current instruction $I_x$ is issued, all the '1' bits in the output of OR gate 66 will be masked by AND gate 68, and the output of OR reduction gate 74 is 0. If the number of free transaction slots is greater than or equal to the number of transaction slots required by instruction $I_x$ (the output of subtractor 56 is positive), both inputs of NOR gate 58 are 0 and so the safe to issue signal 60 is 1, indicating that instruction $I_x$ is safe to issue.

An advantage of the using the onehot encoding and thermometer encoding in this way is that the comparison of the number of available transaction slots (free plus freeable) with the maximum number of transaction slots required by any older instruction can be performed by a simple AND operation and OR reduction (using gates 68, 74) rather than requiring an arithmetic comparator (typically requiring a subtraction). Nevertheless, it will be appreciated that it would also be possible to implement the comparison of the maximum number of transactions and the number of remaining transactions using an arithmetic comparator or subtractor.

Using the example of FIG. 3 above (with instructions $I_0$, $I_1$, $I_2$, $I_3$ corresponding to instructions A, B, C, D respectively), we can see how the circuit of FIG. 5 provides the control for determining whether each instruction is safe to issue:
Numbers of transactions required by each instruction:
$I_0$ tx reqd=1 $I_1$ tx reqd=2 $I_2$ tx reqd=4 $I_3$ tx reqd=1
Age matrix:
 for $I_0$:$I_0$ older=0, $I_1$ older=0, $I_2$ older=0, $I_3$ older=0
 for $I_1$:$I_0$ older=1, $I_1$ older=0, $I_2$ older=0, $I_3$ older=0
 for $I_2$:$I_0$ older=1, $I_1$ older=1, $I_2$ older=0, $I_3$ older=0
 for $I_3$:$I_0$ older=1, $I_1$ older=1, $I_2$ older=1, $I_3$ older=0

If we assume that Tx free 2, Tx freeable=2:
Checking for instruction $I_0$:
  $I_0$ older to $I_3$ older all 0 (no older instruction), so all the AND gates 64-0 to 64-3 output 0, i.e. outputs of gates 66, 68, 74 all 0
  Tx free−$I_0$tx reqd=0, i.e. not negative
  Both inputs to NOR gate 58 are 0, so $I_0$ safe to issue=1.
Checking for instruction $I_1$:
  $I_0$ older=1, $I_0$tx reqd=1, so output of OR gate 66 is 0b00000001
  Tx free−$I_1$ tx reqd=1, i.e. not negative.
  Tx freeable+Tx free−$I_1$ tx reqd=2, i.e. 0b00000011 thermometer-encoded, and inverted to give a mask of 0b11111100

$$\begin{array}{r} \text{AND: } 00000001 \\ \underline{11111100} \\ \overline{00000000} \end{array}$$

output of AND gate 66 is all 0, so OR reduction 74 output is also 0.
  both inputs to NOR gate 58 are 0, so $I_1$ safe to issue=1.
Checking for instruction $I_2$:
  $I_0$ older=1, $I_0$ tx reqd=1, $I_1$ older=1, $I_1$ tx reqd=2, so output of OR gate 66 is 0b00000011
  Tx free−$I_2$ tx reqd=−2, i.e. negative
  one of inputs to NOR gate 58 is 1, so $I_2$ safe to issue=0.
Checking for instruction $I_3$:
  $I_0$ older=1, $I_0$ tx reqd=1, $I_1$ older=1, $I_0$ tx reqd=2, $I_2$ older=1, $I_2$ tx reqd=4, so output of OR gate 66 is 0b00001011
  Tx free−$I_3$ tx reqd=1, i.e. not negative.
  Tx freeable+Tx free−$I_3$ tx reqd=3, i.e. 0b00000111 thermometer-encoded, and inverted to give a mask of 0b11111000

$$\begin{array}{r} \text{AND: } 00001011 \\ \underline{11111000} \\ \overline{00001000} \end{array}$$

output of AND gate 66 includes a 1, so OR reduction 74 output is 1.
  one of inputs to NOR gate 58 is 1, so $I_3$ safe to issue=0.
  Note that in this example instruction $I_3$ (D) has not been determined as safe to issue, even though there are enough free transaction slots to handle instruction $I_3$, because the total number of free/freeable transaction slots 4 is less than the threshold 5 shown in FIG. 3. Instruction $I_3$ is prevented from being serviced because issuing it would result in there being fewer than 4 transaction slots remaining, which could block instruction $I_2$ (C) from issuing (as $I_2$ requires 4 slots), which could cause a deadlock if $I_3$ depends on $I_2$. On the other hand, if there were 5 of more free or freeable slots, then the mask for $I_3$ would 0b11110000, which would mask out all the bits of the output of OR gate 66 so that $I_3$ would be allowed to be serviced (as then the number of available transaction slots would be equal to the threshold number required of 5).

The embodiment of FIG. 5 provides an accurate determination of how many transaction slots need to be free for each instruction to be issued, but requires each request checking circuit 54 to have its own maximum determining circuit 62 to determine the maximum number of transaction slots required by any older instructions than the instruction being checked.

Figure 6:
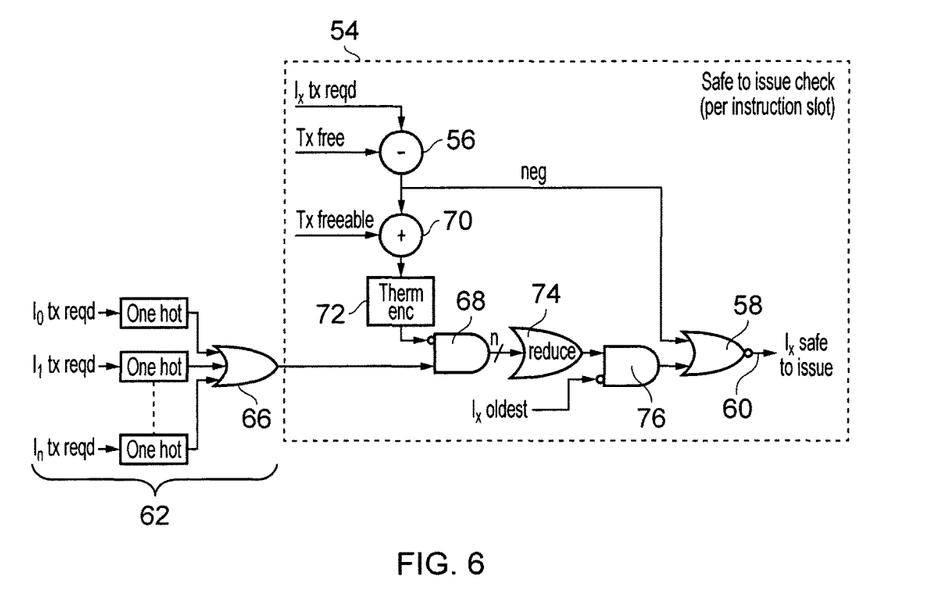
FIG. 6 shows a second example of the checking circuitry.

As shown in FIG. 6, it is possible to trade off accuracy for area/power by performing the check against the maximum number of transaction slots required across all instructions in flight within the instruction queue 40, rather than only for older instructions. This reduces the fan out on the age matrix 50 and means that the select maximum logic 62 is only required once for all instruction slots 41, rather than once per instruction slot 41.

Most of the components of the request checking circuitry 54 in FIG. 6 are the same as in FIG. 5, and are indicated with corresponding reference numerals. However, in this example the maximum determining circuitry 62 is shared among all the request checking circuits 54, and does not comprise any AND gates 64 as there is no need to consider which instructions are older than the instruction $I_x$ being checked. Instead, the number of transaction slots required by each instruction $I_0$ to $I_n$ is onehot-encoded, and the OR gate 66 ORs together all the onehot-encoded values, regardless of the relative age of the instructions. The output of the OR gate 66 again represents the maximum number of transaction slots required by any of the in-flight instructions according to the bit position of the most significant '1' bit. The output of the OR gate 66 is supplied to the AND gate 68 of each request checking circuit 54 (all of the request checking circuits 54 provided per instruction slot 41 will receive the same value from the shared maximum determining circuitry 62).

The subtractor 56, adder 70, thermometer encoder 72, AND gate 68, OR reduction gate 74 and NOR gate 58 are operate in the same way as in FIG. 5 to prevent an instruction $I_x$ being issued if either the number of free transaction slots is less than the number required for instruction $I_x$ or if the total of free and freeable transaction slots is less than the threshold number (maximum determined by shared circuit 62+number of transaction slots required by instruction $I_x$) determined for that instruction. However, unlike in FIG. 5, in FIG. 6 an additional AND gate 76 is provided between the OR reducer 74 and the NOR gate 58 to ensure that the second input to the NOR gate 58 is cleared to 0 when the current instruction $I_x$ is the oldest instruction remaining. This is because, unlike in FIG. 5, as the relative age of the instructions is not considered by maximum determining circuitry 62, the output of the maximum determining circuitry 62 can be non-zero for the oldest remaining instruction, which could lead to the output of OR reducer 74 indicating that the instruction should be blocked from being serviced. As the oldest remaining instruction will not be dependent on any younger instruction, and blocking the oldest remaining instruction could result in other instructions being blocked, it is desirable to always allow the oldest remaining instruction to be serviced (provided there are enough free instruction slots), and so by overriding the output of OR reducer 74 for the oldest instruction, deadlocks can be avoided.

The approach shown in FIG. 6 is less accurate than FIG. 5, because if any one instruction in flight requires a large number of transaction slots, all other instructions (other than the oldest instruction) must wait for there to be more slots free even if they are older than the instruction requiring the large number of slots. Nevertheless, this reduction in accuracy may be acceptable. If, in practice, most instructions do not request the maximum possible number of slots, then most of the time the approach shown in FIG. 6 would not significantly decrease performance, and it is only when occasionally an instruction requests a higher number of slots that this could slow down performance of some other instructions. Hence, the performance in the common case is still good because relatively small number of slots would usually be reserved, but the logic is able to cope with the extreme case when an instruction requests a high number of transaction slots, while requiring less circuit area than before.

In FIGS. 5 and 6, the number of available transaction slots considered for comparing against the threshold includes both free and freeable transaction slots. However, it will be appreciated that it is not essential to consider freeable transaction slots as available. Other embodiments could omit adder 70, so that the comparison is based only on free transaction slots, not freeable transaction slots. Considering only free transactions may be simpler and require less circuitry because it may not be necessary to track dependencies between different transactions in order to determine which transaction slots are freeable, but considering both free and freeable transaction slots as available this improves performance by allowing some instructions to issue earlier before freeable transaction slots have drained.

Also, in the approach shown in FIG. 5 or FIG. 6, the comparison provided by AND gate 68 effectively compares two quantities:
- the output of thermometer encoder 72 represents the number of remaining slots which would still be available after the current instruction has issued (i.e. the difference between the number of available transaction slots and the number of transaction slots required by the current instruction $I_x$).
- the output of maximum determining circuit 62 represents the maximum number of slots required among at least one other instruction.

Hence, instruction $I_x$ is prevented from being serviced if the number of remaining slots is less than the maximum number.

Figure 7:
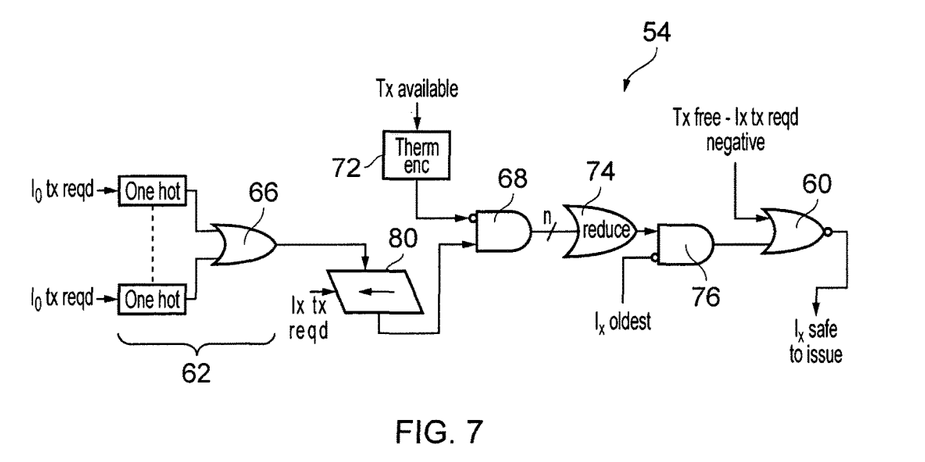
FIG. 7 shows a third example of the checking circuitry.

However, as shown in FIG. 7 another approach is to use the number of transactions required by the current instruction IX to adjust the maximum value output by the maximum determining circuitry 62, instead of the number of available transaction slots. Hence, the thermometer encoding could simply encode the number of available transaction slots (which could be free slots only, or both free and freeable as discussed above). A shifter 80 could left-shift the output of maximum determining circuitry 62 by a number of bit positions corresponding to the number of transactions required by the current instruction L. In this case, the comparison is essentially between:
- the number of available transaction slots, as represented by the output of the thermometer encoder 72;
- the threshold number of transaction slots (corresponding to the sum of the number of transaction slots required by the current instruction $I_x$ and the maximum number of slots required among at least one other instruction), as represented by the output of shifter 80.

The other circuitry may function in the same way as described earlier for FIGS. 5 and 6. While FIG. 7 for sake of example shows the approach of FIG. 6 having shared maximum determining circuitry 62, alternatively the technique shown in FIG. 5 could be used where each request checking circuit 54 has a separate maximum determining circuit 62 for determining the maximum based on the relative age of instruction $I_x$ compared to other instructions.

In the examples of FIGS. 2 to 7, the requests being arbitrated are data access instructions and the resources required by each request are transaction slots for handling memory access transactions. However, the same arbitration technique could be applied to any other situation in which there are a number of requests pending which require a variable number of resources to be serviced, and which can be issued out of order.

For example, as shown in FIG. 1, the L1 data cache 26 may have a linefill buffer 100 for buffering data fetched from the L2 cache 28 or memory 30 while it is waiting to be allocated into the L1 data cache 26 or read by the processor 4. The L1 data cache 26 may issue linefill requests for data to the L2 cache 28 or memory 30, and an arbiter 44 as discussed above may be provided to determine whether to allow given linefill requests to be serviced in dependence on availability of space within the linefill buffer 100 and the amount of buffer space required by each linefill request. Similarly, the technique could be applied to other kinds of requests requiring variable numbers of resources.

Figure 8:
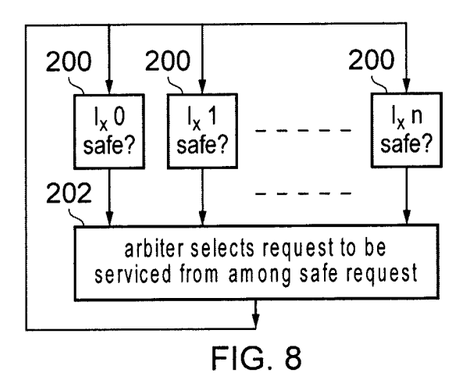
FIG. 8 shows a method of arbitrating between requests.

FIG. 8 shows a method of arbitrating between requests. At steps 200, a number of checks are performed in parallel for each pending request to determine whether that request is safe to issue. For each request, a signal is generated indicating whether or not that instruction is safe to issue. At step 202, the arbiter 53 selects a request to be serviced from among the requests which have been indicated as safe to issue. For example, the arbiter 53 could use an age-based selection to select the oldest request among the requests determined as safe to issue, or other arbitration schemes such as round robin or random.

Figure 9:
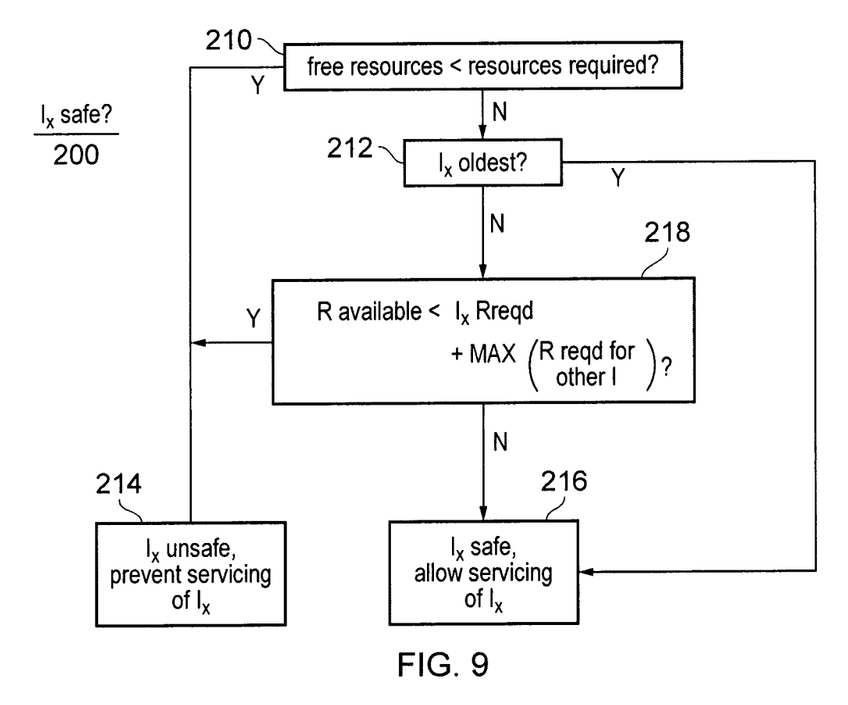
FIG. 9 shows a method of checking whether a given request is safe to issue.

FIG. 9 shows the processing performed at each of the checking steps 200 in more detail. At step 210, it is determined whether the number of free resources is less than the number of resources required by the current request $I_x$. If so, then at step 214 it is determined that the current request $I_x$ is unsafe to issue, and servicing of that instruction is prevented. If there are enough free resources to service the current request $I_x$, at step 212 it is determined whether the current request $I_x$ is the oldest request remaining, and if so then at step 216 the current request $I_x$ is determined to be safe and the arbiter 53 is allowed to select the current request $I_x$ for servicing at step 202 of FIG. 8. If the current request $I_x$ is not the oldest remaining, then at step 218 it is determined whether the number of available resources is less than a threshold number of resources corresponding to the sum of the number of resources required for the current request $I_x$ and the maximum of one or more numbers of resources required for at least one other request. The at least one other request could be all pending requests or could be only requests older than the current request $I_x$. If the number of available resources is less than the threshold, then at step 214 the instruction is again prevented from being serviced. If the number of available resources is equal to the threshold or greater than the threshold, at step 216 the request is considered safe and is allowed to be serviced. Note that even if step 216 determines a given request as safe to issue, this does not necessarily mean that it will be serviced in that cycle, because the arbiter 53 may not select that request at step 202 if there are other requests which are also determined as safe to issue.

In summary, by dynamically changing the threshold number of resources required for a given request to be serviced (i.e. the number of resources effectively reserved for another request) based on the requirements of other requests in flight, the resources can be managed more efficiently.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
   arbitration circuitry to arbitrate between a plurality of requests awaiting servicing, each request requiring a variable number of resources in order to be serviced, wherein the arbitration circuitry is configured to permit servicing of the requests in a different order to an order in which the requests were received;
   wherein the arbitration circuitry comprises checking circuitry to determine whether a given request other than an oldest request can be serviced depending on whether a number of available resources is less than a variable threshold number of resources, wherein the checking circuitry is configured to prevent said given request other than the oldest request from being serviced when the number of available resources is less than the variable threshold number of resources; and
   the checking circuitry is configured to vary said variable threshold number of resources in dependence on the number of resources required for at least one other request awaiting servicing;
   wherein the checking circuitry comprises a plurality of request checking circuits; and
   one of:
   (a) each request checking circuit is configured to determine whether to prevent a corresponding request from being serviced in dependence on said number of available resources, the number of resources required by said corresponding request and a maximum of one or more respective numbers of resources corresponding to at least one older request still to be selected for servicing which was received before said corresponding request; or
   (b) the checking circuitry comprises maximum determining circuitry to determine a maximum number of resources corresponding to a maximum of the respective numbers of resources required by said plurality of requests; and each request checking circuit is configured to determine whether a corresponding request should be prevented from being serviced in dependence on said number of available resources, the number of resources required by said corresponding request, and the maximum number of resources determined by said maximum determining circuitry.

2. The apparatus according to claim 1, wherein the checking circuitry is configured to vary said variable threshold number of resources for the given request in dependence on the number of resources required for said given request and said number of resources required for said at least one other request.

3. An apparatus comprising:
   arbitration circuitry to arbitrate between a plurality of requests awaiting servicing, each request requiring a variable number of resources in order to be serviced, wherein the arbitration circuitry is configured to permit servicing of the requests in a different order to an order in which the requests were received;
   wherein the arbitration circuitry comprises checking circuitry to determine whether a given request other than an oldest request can be serviced depending on whether a number of available resources is less than a variable threshold number of resources, wherein the checking circuitry is configured to prevent said given request other than the oldest request from being serviced when the number of available resources is less than the variable threshold number of resources; and
   the checking circuitry is configured to vary said variable threshold number of resources in dependence on the number of resources required for at least one other request awaiting servicing;
   wherein the checking circuitry is configured to vary said variable threshold number of resources in dependence on a maximum number of resources corresponding to a maximum of one or more respective numbers of resources required for each of said at least one other request; and
   one of:
   (a) said variable threshold number of resources for the given request corresponds to a sum of the number of resources required for said given request and said maximum number of resources; or
   (b) the checking circuitry is configured to determine a number of remaining resources corresponding to a difference between the number of available resources and the number of resources required for said given request, and prevent the given request being serviced when the number of remaining resources is smaller than the maximum number of resources.

4. The apparatus according to claim 3, wherein the checking circuitry is configured to:
   generate a first value in which a position of a most significant non-zero bit is dependent on said maximum number of resources, and a second value including a least significant portion of bits equal to 0 and any remaining bits equal to 1, where the number of bits in the least significant portion of the second value is dependent on said number of available resources, and one of said position of said most significant non-zero bit in said first value and said number of bits in the least significant portion of said second value is dependent on the number of resources required for said given request;
   perform a bitwise AND operation on the first value and the second value to generate a comparison value; and
   prevent the given request being serviced when the comparison value includes at least one bit equal to 1.

5. The apparatus according to claim 1, wherein said at least one other request comprises at least one older request still to be selected for servicing which was received before said given request.

6. The apparatus according to claim 1, wherein said at least one other request comprises all other requests still to be selected for servicing.

7. The apparatus according to claim 1, wherein the checking circuitry is configured to determine whether the oldest request can be serviced regardless of the number of resources required by other requests.

8. The apparatus according to claim 1, wherein said number of available resources comprises a number of free resources which are free to be allocated for servicing one of the requests.

9. The apparatus according to claim 1, wherein said number of available resources comprises a total number of free resources and freeable resources;
the free resources comprising resources which are free to be allocated for servicing one of the requests; and
the freeable resources comprising resources currently allocated for servicing a request, for which freeing of the resource is independent of an outcome of any other outstanding request.

10. The apparatus according to claim 9, wherein said checking circuitry is also configured to prevent the given request being serviced when the number of free resources is less than the number of resources required for the given request.

11. The apparatus according to claim 1, wherein the checking circuitry is configured to determine, for each of the requests, whether the corresponding request is allowed to be serviced or prevented from being serviced; and
the arbitration circuitry is configured to select a request to be serviced from among the requests determined as allowed to be serviced by the checking circuitry.

12. The apparatus according to claim 1, wherein the checking circuitry is configured to determine whether to allow or prevent the given request being serviced independently of whether the given request is dependent on another request.

13. The apparatus according to claim 1, wherein the checking circuitry is configured to vary the variable threshold number of resources for the given request over time as other requests are received or serviced.

14. The apparatus according to claim 1, wherein each request comprises a data access instruction for triggering a variable number of data access transactions for accessing data in a data store; and
the resources comprise transaction slots for handling said data access transactions.

15. The apparatus according to claim 1, wherein each request comprises a cache linefill request for requesting that a variable amount of data is loaded to a cache from a memory or further cache; and
the resources comprise storage space in the buffer for buffering data loaded from the memory or further cache.

16. A data processing method comprising:
arbitrating between a plurality of requests awaiting servicing, each request requiring a variable number of resources in order to be serviced, wherein the requests are permitted to be serviced in a different order to an order in which the requests were received; and
determining whether a given request other than an oldest request can be serviced depending on whether a number of available resources is less than a variable threshold number of resources, and preventing said given request other than the oldest request from being serviced when the number of available resources is less than the variable threshold number of resources, wherein the variable threshold number of resources is varied in dependence on the number of resources required for at least one other request awaiting servicing;
wherein the determining is performed using a plurality of request checking circuits; and
one of:
(a) each request checking circuit determines whether to prevent a corresponding request from being serviced in dependence on said number of available resources, the number of resources required by said corresponding request and a maximum of one or more respective numbers of resources corresponding to at least one older request still to be selected for servicing which was received before said corresponding request; or
(b) maximum determining circuitry determines a maximum number of resources corresponding to a maximum of the respective numbers of resources required by said plurality of requests; and each request checking circuit determines whether a corresponding request should be prevented from being serviced in dependence on said number of available resources, the number of resources required by said corresponding request, and the maximum number of resources determined by said maximum determining circuitry.

* * * * *